May 24, 1960   F. SOMMERMEYER   2,937,586
FOCUSING HOOD STRUCTURE FOR PHOTOGRAPHIC CAMERAS
Filed Feb. 27, 1956   2 Sheets-Sheet 1

2,937,586

United States Patent Office

Patented May 24, 1960

2,937,586

FOCUSING HOOD STRUCTURE FOR PHOTOGRAPHIC CAMERAS

Friedrich Sommermeyer, Braunschweig, Germany, assignor to Franke & Heidecke, Fabrik Photographischer Prazisions-Apparate, Braunschweig, Germany, a firm Filed Feb. 27, 1956, Ser. No. 568,068

Claims priority, application Germany Mar. 2, 1955

7 Claims. (Cl. 95—47)

This invention relates to a photographic camera, and more particularly to a camera of the type having a reflex view finder.

An object of the invention is the provision of a generally improved and more satisfactory camera of this kind.

Another object is the provision of a camera having a removable view finder hood, and having improved means for securing the hood in a detachable manner to the camera.

Still another object is the provision of a simple adapter or intermediate element for detachable mounting on the camera body, which adapter in turn serves as a mounting for the detachable hood of the view finder.

A further object is the provision of a special adapter for mounting on a photographic camera, so designed and constructed that a focusing hood may be mounted on the adapter in angular or non-parallel relation to the camera body.

These and other desirable objects may be attained in the manner disclosed as an illustrative embodiment of the invention in the following description and in the accompanying drawings forming a part hereof, in which.

The same reference numerals throughout the several views indicate the same parts.

Figure 1:
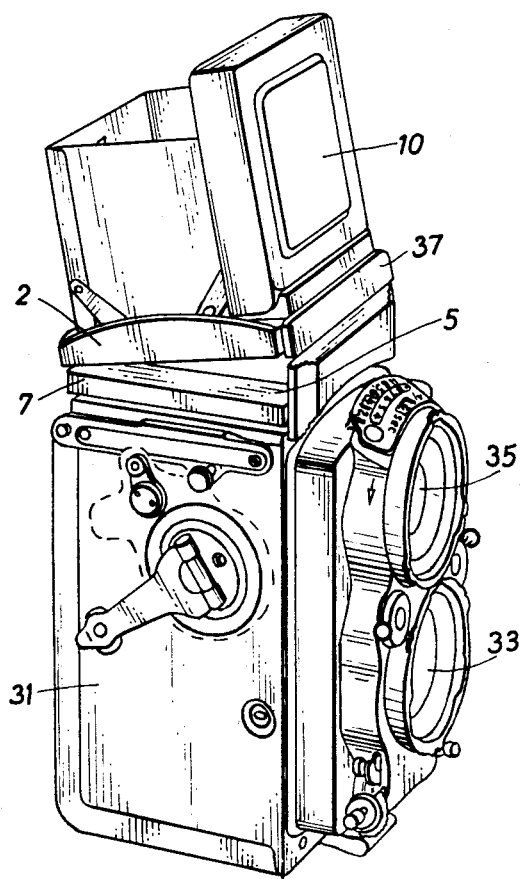
Fig. 1 is a perspective view of a camera equipped with a focusing hood and an intermediate element or adapter in accordance with one embodiment of the present invention.

The camera body indicated in general at 31 is preferably of the twin lens reflex type, embodying a lower or picture taking lens 33 and an upper or finder lens 35, the former admitting light (when the shutter is open) to the exposure chamber so as to fall upon the sensitized film, and the latter admitting light to a finder chamber located above the exposure chamber and provided with a reflecting element or mirror so as to throw the light upwardly onto a focusing screen 9 of ground glass or the like, located horizontally at the top of the camera body. The two lenses 33 and 35 are mounted together on a front member or carrier which moves forwardly and rearwardly with respect to the main parts of the camera body, for focusing purposes. Cameras of this kind are in general well known, and it is to cameras of this type that the present invention particularly relates, although various features of the invention may be used also on other cameras.

Cameras of the kind or type mentioned normally have a focusing hood mounted at the top of the camera body so that the walls of the hood rise upwardly in surrounding relation to the focusing screen 9, for the purpose of shading or shadowing the screen so that the finder image thereon may be more readily observed. In some cameras of this general type the focusing hood is permanently mounted on the camera body; in others, it is removable or detachable from the camera body.

According to the present invention, a detachable and removable hood is used. The camera body 31 is provided at its top with side rails 1 having laterally extending flanges or ribs projecting outwardly from these side rails and extending horizontally forwardly and rearwardly, the front ends of these ribs terminating somewhat short of the front of the camera, as well seen in Fig. 2.

Figure 2:
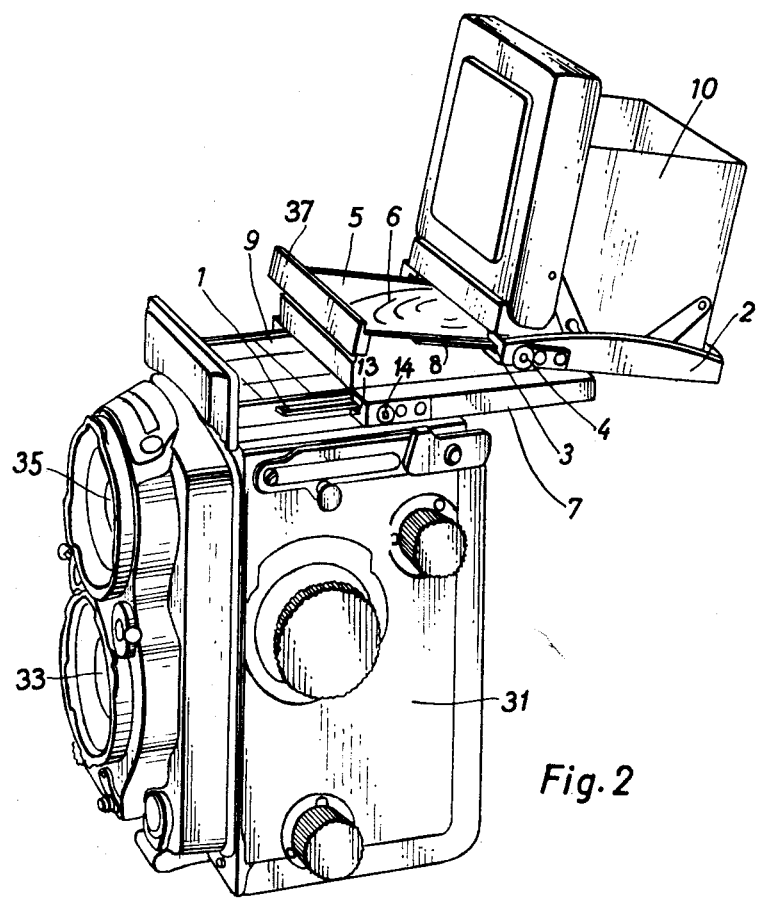
Fig. 2 is a perspective view of the same parts in a different position.
Figure 3:
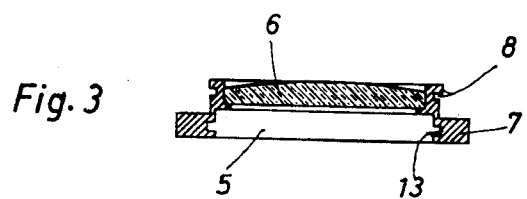
Fig. 3 is a vertical section taken transversely through the intermediate element or adapter.

The focusing hood (for example, a folding hood of the kind shown in general at 10) is provided at its bottom with a frame 2 the side members of which have longitudinally extending channels or grooves 3, the grooves being open on their sides faced inwardly toward each other, and being of the proper size to fit snugly and slidably on the outwardly extending lateral flanges or ribs of the side rails 1 of the camera body. Thus the frame 2 of the hood 10 may be placed on or removed from the rails 1 of the camera, by a horizontal longitudinal motion. When the hood frame 2 is in normal position fully mounted on the camera body, it is held in this position against accidental displacement therefrom by means of the latching or locking plunger 4 mounted on the frame 2 near its front end, which plunger is spring pressed horizontally inwardly so that the inner end of the plunger engages the side rail 1 just in front of the lateral rib or flange thereof, thereby preventing the hood frame 2 from moving rearwardly along the rails 1. The front of the hood frame engages a flange which rises from the front of the camera body, as seen in Fig. 2, to prevent forward movement of the hood frame. When it is desired to remove the hood, the plunger 4 is pulled laterally outwardly against the tension of its spring, so as to disengage the inner end of the plunger from a position alined with the front end of the rib or flange on the rails 1, after which the hood frame 2 may be drawn horizontally rearwardly to take it off of the rails 1.

According to the present invention, an intermediate element or adapter is provided, to be removably mounted on the rails 1 and to receive, in turn, the hood frame 2. This intermediate element is indicated in general at 5, and preferably contains a horizontally arranged field lens 6 which overlies the focusing screen 9 when the intermediate element is mounted in normal position on the camera body, and which serves to magnify the finder image. The intermediate element 5 is formed at its bottom with side frame members 7 which are similar to the side frame members 2 of the hood 10, and which have longitudinally extending internal grooves 13 along their inner faces, similar to the grooves 3 in the frame members 2, so that this frame 7 of the intermediate element or adapter 5 may slide onto and engage with and be mounted detachably on the rails 1 of the camera, in exactly the same way that the hood frame 2 may be mounted thereon. The frame 7 of the adapter 5 is also latched in mounted position by a spring pressed plunger 14 of the same construction as the latching plunger 4 previously described.

In addition to the frame 7 at the bottom of the intermediate element 5, this element is provided at its top with rails for receiving the hood frame 2, these rails having outwardly extending flanges or ribs 8 of the size to make a snug sliding fit with the grooves 3 in the frame 2 of the hood 10. At its front end the adapter has an upwardly extending flange 37 which serves as a stop or abutment to limit the forward motion of the hood frame 2, and the front ends of the flanges 8 terminate short of this flange 37 so that, when the hood is mounted in its normal position on the adapter, the plunger 4 will engage in front of the front end of the flange 8, to latch the hood in position on the adapter, just as it may be similarly latched in position on the rails 1 of the camera body.

The intermediate element or adapter 5 may be of any desired shape and type. Preferably it is of tapered or wedge shape as well seen in Figs. 1 and 2, so that when the adapter is mounted on the camera body and the hood is mounted on the adapter, the vertical axis of the hood (that is, the axis which would be vertical if the hood were normally mounted directly on the camera body) is tilted or inclined somewhat rearwardly, thus enabling the user to view the focusing screen somewhat obliquely from the rear, instead of vertically downwardly from a position directly above the focusing screen. This tapered or wedge shaped arrangement is desirable in many circumstances. However, it is within the scope of the invention to have the top and bottom guideways of the intermediate element parallel to each other, if desired, in which case the use of the intermediate element serves effectively to increase the height of the focusing hood, and at the same time to interpose the field lens 6 in the viewing path. Again, it is within the scope of the invention to make the intermediate element tapered or wedge shaped in a lateral or sideways direction, rather than in a front to rear direction, so that the focusing hood will be tilted sideways rather than rearwardly, to enable better viewing under special circumstances. Also, of course, the field lens 6 can be set loosely in the frame 5 of the intermediate element, so that it may be removed when not wanted, or it may be omitted altogether.

The intermediate element 5, when not in normal use for viewing purposes, may also serve as a housing or carrying member for containing and protecting various attachments and accessories, such as a light meter, supplementary lenses, filters, sunshades, and so forth.

In the preferred form of the invention, the bottom guideways of the intermediate element or adapter correspond to the bottom guideways of the focusing hood, and the top guideways of the adapter correspond to the guideways on the camera body, with the result that the focusing hood may be used selectively either on the adapter, or directly on the camera body. However, if it is desired to make it impossible to use the focusing hood directly on the camera body, then the respective guideways are made with a variation or difference, so that the focusing hood will fit on the intermediate element or adapter, but will not fit directly on the camera body.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic camera comprising a body, a finder lens, a focusing screen mounted on said body for receiving an image formed by light passing through said lens, a focusing hood mounted externally of said screen for shielding said screen from extraneous light, parallel guideways on said body adjacent opposite sides of said screen, parallel guideways on said hood adapted to engage slidably with said guideways on said body for attaching said hood to and mounting it on said body in proximity to said screen, and an intermediate element adapted to be removably interposed between said body and said hood for mounting said hood on said body in a position more remote from said screen and for containing a camera accessory, said intermediate element including a first set of parallel guideways adapted to engage slidably with said guideways on said body for attaching said element to said body, and a second set of parallel guideways adapted to engage slidably with said guideways on said hood for attaching said hood to said element.

2. A photographic camera comprising a body, a finder lens, a focusing screen mounted on said body for receiving an image formed by light passing through said lens, a focusing hood mounted externally of said screen for shielding said screen from extraneous light, parallel guideways on said body adjacent opposite sides of said screen, parallel guideways on said hood adapted to engage slidably with said guideways on said body for attaching said hood to and mounting it on said body in proximity to said screen, and an intermediate element adapted to be interposed between said body and said hood for mounting said hood on said body in a position more remote from said screen, said intermediate element including a first set of parallel guideways adapted to engage slidably with said guideways on said body for attaching said element to said body, a second set of parallel guideways adapted to engage slidably with said guideways on said hood for attaching said hood to said element, and a field lens mounted in said element in position to overlie said focusing screen and magnify the appearance of the image thereon, when said intermediate element is normally mounted on said body.

3. A construction as defined in claim 1, in which said second set of guideways on said intermediate element are spaced from said first set of guideways in a direction perpendicular to said focusing screen, so that when said hood is mounted on said intermediate element the effective height of the hood is increased as compared to its height when mounted directly on the camera body without using said intermediate element.

4. A photographic camera comprising a body, a finder lens, a focusing screen mounted on said body for receiving an image formed by light passing through said lens, a focusing hood mounted externally of said screen for shielding said screen from extraneous light, parallel guideways on said body adjacent opposite sides of said screen, parallel guideways on said hood adapted to engage slidably with said guideways on said body for attaching said hood to and mounting it on said body in proximity to said screen, and an intermediate element adapted to be removably interposed between said body and said hood for mounting said hood on said body in a position more remote from said screen and for containing a camera accessory, said intermediate element including a first set of parallel guideways adapted to engage slidably with said guideways on said body for attaching said element to said body, and a second set of parallel guideways adapted to engage slidably with said guideways on said hood for attaching said hood to said element, second set of guideways on said intermediate element being at an angle to said first set of guideways, so that when said hood is mounted on said intermediate element and said element is mounted on said camera body, said hood will be tilted relative to said focusing screen, as compared with its position when mounted directly on the camera body without using said intermediate element.

5. An intermediate adapter for optional use with a reflex camera of the kind having a focusing screen and a hood-receiving guideway adjacent said screen and extending approximately parallel to said screen and adapted to receive a mating guideway on a detachable focusing hood, said intermediate adapted including a frame having approximately the outline of said screen and having on one face of said frame a first guideway interengaging and mating with said guideway on the camera and having on an opposite face of said frame a second guideway interengaging and mating with said guideway on the focusing hood, whereby said intermediate adapted may be used to connect said detachable focusing hood to said camera in a different position relative thereto than when said hood is engaged directly with the guideway on the camera, said first and second guideways on said adapter being in planes titled at an angle to each other, so that when said adapter is interengaged with both the camera and the focusing hood, the focusing hood will be tilted at a different angle to the camera than when the focusing hood is engaged directly with the camera.

6. A construction as defined in claim 5, in which said intermediate adapter carries an optical element in position to overlie the focusing screen of the camera when said adapter is normally positioned on the camera.

7. A construction as defined in claim 6, in which said optical element is a field lens.

References Cited in the file of this patent

UNITED STATES PATENTS

| | | |
|---|---|---|
| 1,060,834 | Folmer | May 6, 1913 |
| 1,202,294 | Lang | Oct. 24, 1916 |
| 1,737,038 | Beidler et al. | Nov. 26, 1929 |
| 1,841,811 | Hershberg | Jan. 19, 1932 |

FOREIGN PATENTS

| | | |
|---|---|---|
| 603,181 | Germany | Sept. 24, 1934 |